US010209938B2

(12) United States Patent
Prabhu et al.

(10) Patent No.: US 10,209,938 B2
(45) Date of Patent: Feb. 19, 2019

(54) ACQUISITION OF LINKED VERSIONS OF PRINT CONTENT HAVING MACHINE-READABLE LINKS

(71) Applicant: Hewlett-Packard Development Company, L.P., Houston, TX (US)

(72) Inventors: Sandeep Matti Prabhu, Bangalore (IN); Sibin Jos Koothur, Bangalore (IN); Bibhu Prasad Biswal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/129,307

(22) PCT Filed: Jan. 20, 2015

(86) PCT No.: PCT/US2015/011997
§ 371 (c)(1),
(2) Date: Sep. 26, 2016

(87) PCT Pub. No.: WO2015/152982
PCT Pub. Date: Oct. 8, 2015

(65) Prior Publication Data
US 2017/0177286 A1 Jun. 22, 2017

(30) Foreign Application Priority Data

Mar. 31, 2014 (IN) .......................... 1723/CHE/2014

(51) Int. Cl.
*G06F 3/12* (2006.01)
*H04N 1/00* (2006.01)

(52) U.S. Cl.
CPC .......... *G06F 3/1285* (2013.01); *G06F 3/1204* (2013.01); *G06F 3/1271* (2013.01); *H04N 1/00127* (2013.01)

(58) Field of Classification Search
None
See application file for complete search history.

(56) References Cited

U.S. PATENT DOCUMENTS 6,975,419 B2    12/2005    Staas et al.
7,039,214 B2    5/2006    Miller et al.
(Continued)

FOREIGN PATENT DOCUMENTS

EP    2278497 A2    1/2011
KR    20130074853    5/2013
(Continued)

OTHER PUBLICATIONS

"Fuji Xerox Launches Skydesk Media Switch, a Cloud Software-as—A-service Linking Print Materials to Digital Media, in Asia Pacific." Nov. 2013, <http://www.fujixerox.com.hk/ 2 pages.
(Continued)

*Primary Examiner* — Lennin R RodriguezGonzalez
(74) *Attorney, Agent, or Firm* — HP Inc. Patent Department (57) ABSTRACT

Examples disclosed herein relate to acquisition of linked versions of print content having machine-readable links. Examples include acquisition of a message requesting that print content be printed at a destination printing device via the remote printing service, the message comprising link information specifying a selected type of optically machine-readable link and a digital content payoff. Examples further include acquisition, from a linking service, of a linked version of the print content comprising an optically machine-readable link that is associated with the digital content payoff via the linking service.

15 Claims, 3 Drawing Sheets

(56) References Cited

U.S. PATENT DOCUMENTS

| | | | |
|---|---|---|---|
| 7,778,437 | B2 | 8/2010 | Rhoads et al. |
| 7,830,535 | B2 | 11/2010 | Komatsubara |
| 8,286,068 | B2 | 10/2012 | Brush et al. |
| 8,494,838 | B2 | 7/2013 | Donabedian et al. |
| 9,531,707 | B1* | 12/2016 | Daniel ............... H04L 63/0861 |
| 2005/0012949 | A1* | 1/2005 | Kitahara ............... G06F 17/214 358/1.11 |
| 2007/0064074 | A1* | 3/2007 | Silverbrook ............... B41J 3/36 347/101 |
| 2011/0085198 | A1 | 4/2011 | Son et al. |
| 2012/0045089 | A1 | 2/2012 | Ramos et al. |
| 2012/0234907 | A1 | 9/2012 | Clark et al. |
| 2012/0250076 | A1 | 10/2012 | Kumar et al. |
| 2012/0284602 | A1 | 11/2012 | Seed et al. |
| 2013/0107312 | A1* | 5/2013 | Venkatesh ............ G06F 3/1207 358/1.15 |
| 2013/0334300 | A1 | 12/2013 | Evens |
| 2014/0025512 | A1 | 1/2014 | Armstrong et al. |
| 2014/0029035 | A1 | 1/2014 | Maruyama et al. |
| 2014/0177006 | A1 | 6/2014 | Sirigiri et al. |
| 2014/0185089 | A1* | 7/2014 | Nuggehalli ........... G06F 3/1204 358/1.15 |

FOREIGN PATENT DOCUMENTS

| | | |
|---|---|---|
| WO | WO-2013019742 | 2/2013 |
| WO | WO-2013056340 | 4/2013 |
| WO | WO-2015132793 | 9/2015 |

OTHER PUBLICATIONS

DIGIMARC, "Online Embedding—Create Your Own Interactive Matertais," available Feb. 10, 2014, <http://www.digimarc.com/discover/online-embedding> 2 pages.

Free Dwnloads Center. "AWinware Pdf Watermark 1.0.1.3," Editor's review, (Web Page), Dec. 7, 2012, <http://www.freedownloadscenter.com/ ~ 2 pages.

Girgensohn, A. et al., "A Tool for Authoring Unambiguous Links From Printed Content to Digital Media," ACM, Nov. 28-Dec. 1, 2011, pp. 1561-1564.

HP Autonomy, "Aurasma Partner Guidelines: A comprehensive guide to Aurasma," Feb. 10, 2014 <http://www-cdn.aurasma.com/ ~ 37 pages.

Kaywa, "Free QR Code Generator, Coupon, Contact & Design QR Codes & Trackhg," available Feb. 10, 2014, <http://qrcode.kaywa.com>. 1 page.

Ros Hodgekiss, "Plan to scan: QR codes and HTML email," Campaign Monitor, (web page), Jun. 11, 2012, <http://www.campaignmonitor.com/~ 4 pages.

TagMyDoc, "TagMyDoc," (Web page) available Mar. 17, 2014, <http://www.tagmydoc.com/> 9 pages.

Wikipedia, "Barcode" Feb. 27, 2014, <http://en.wikipedia.org/wiki/Barcode> 21 pages.

Wikipedia, "QR code," Jan. 25, 2014, <http://en.wikipedia.org/wiki/Qr_code> 17 pages.

Wikipedia, "Vine (software)," Mar. 6, 2014, <http://en.wikipedia.org/wiki/Vine_(software)> 4 pages.

Williams, "Use QR Codes to share documents," Betanews, Aug. 10, 2012, <http://betanews.com/ ~ 2 pages.

* cited by examiner

ACQUISITION OF LINKED VERSIONS OF PRINT CONTENT HAVING MACHINE-READABLE LINKS

BACKGROUND

Various types of machine-readable links, such as one- or two-dimensional barcodes, digital watermarks, images, and the like, may be optically readable by a computing device with an image capture device. Such machine-readable links may be encoded or associated with various types of information. In some examples, a machine-readable link may be encoded or associated with information identifying content accessible over a computer network.

BRIEF DESCRIPTION OF THE DRAWINGS

The following detailed description references the drawings, wherein.

DETAILED DESCRIPTION

As noted above, a machine-readable link may be encoded or associated with information identifying content accessible over a computer network. For example, a computing device having an image capture device (e.g., a digital camera, or the like) may capture the machine-readable link and then communicate with a linking service to access content (e.g., a video, a website, etc.) associated with the machine-readable link by the linking service.

A link creator may utilize such a linking service to create a given machine-readable link and associate it with desired content. In some examples, a link creator may register to access a developer portal (or other developer user interface) established for the linking service, sign in to the developer portal, and then use an established creation workflow to create the machine-readable link and associate it with the desired content. The created machine-readable link may then be printed or incorporated into a document (or other print content) and then printed as part of the document. However, using separate processes and systems to manually create a machine-readable link, incorporate the link into a document, and then print the document with the link may be inconvenient and cumbersome for a user.

To address these issues, examples described herein may generate a machine-readable link, incorporate the machine-readable link into print content, and print the print content comprising the machine-readable link, all in response to a message requesting that the print content be printed via a remote printing service. In some examples, a remote printing service may acquire a message requesting that included print content be printed at a destination printing device via the remote printing service, the message comprising link information specifying a selected type of optically machine-readable link and a digital content payoff. In such examples, the remote printing service may determine which of a plurality of different types of optically machine-readable links is specified in the link information and, based on the determination, may acquire, from a linking service, a linked version of the print content comprising an optically machine-readable link of the determined type that is associated with the digital content payoff via the linking service. In some examples, the remote printing service may further make available, to the destination printing device, the linked version of the print content in a print-ready format for the destination printing device.

In such examples, the process of creating a machine-readable link (i.e., an optically machine-readable link) for print content and then printing the print content comprising the machine-readable link may be simplified by incorporating the machine-readable link creation process into a process for printing the print content via a remote printing service. In some examples described herein, in response to a single message (e.g., a single email message) specifying print content and link information, a remote printing service may acquire an optically machine-readable link in accordance with the link information and provide a linked version of the print content comprising the acquired machine-readable link to a destination printing device for printing. In this manner, examples described herein may significantly simplify a process for creating a machine-readable link and printing print content comprising the machine-readable link.

Figure 1:
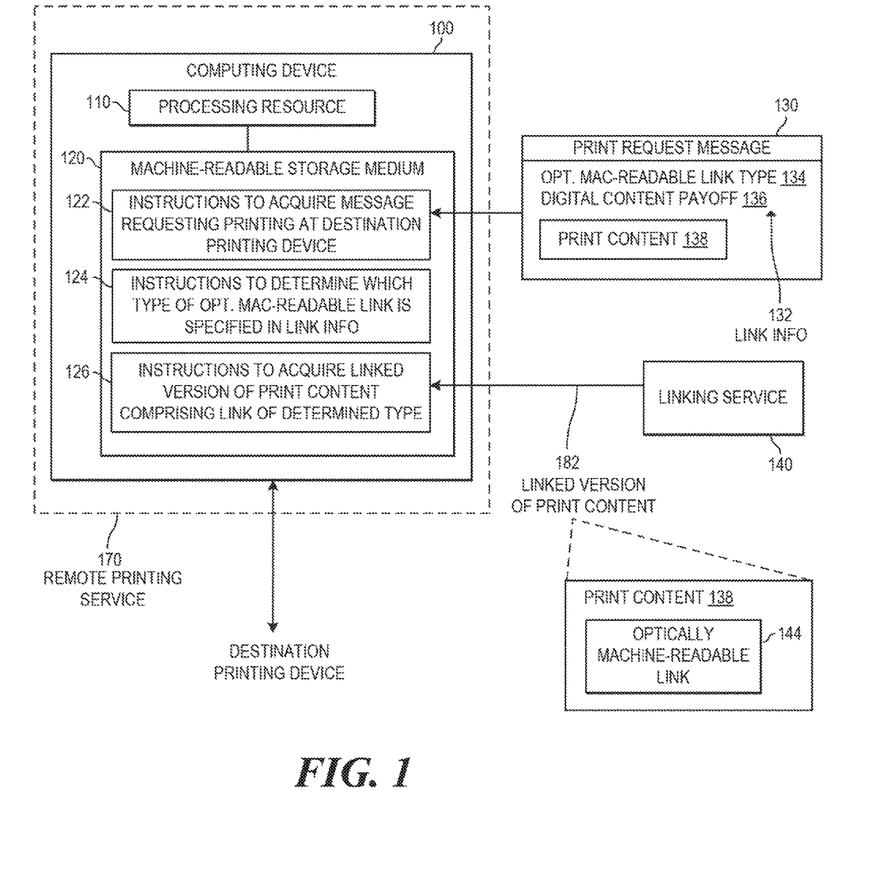
FIG. 1 is a block diagram of an example remote printing service to acquire a linked version of print content to be printed at a destination printing device.

Referring now to the drawings, FIG. 1 is a block diagram of an example remote printing service 170 to acquire a linked version 182 of print content to be printed at a destination printing device. In the example of FIG. 1, remote printing service 170 includes at least one computing device 100 to implement remote printing service 170.

In examples described herein, a "remote printing service" may be a service implemented by one or more networked computing devices to receive, from a sending computing device, a message requesting that specified print content be printed at a destination printing device, and to make the specified print content available to the destination printing device a print-ready format, wherein the sending computing device and the printing device are each remote from the networked computing device(s) implementing the remote printing service. In examples described herein, a remote printing service may receive messages requesting printing from any of a plurality of different sending computing devices, and may make print content available to any of a plurality of different destination printing devices. In some examples, a message requesting printing may include the print content or may otherwise indicate (e.g., provide a reference to) the print content. In some examples, a message requesting printing may be an email message. In examples described herein, first device "remote" from a second device may be a first device that is separate from, and not directly connected to, the second device, wherein the first and second devices may access one another over a computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In the example of FIG. 1, remote printing service 170 (e.g., at least computing device 100) is in communication with at least one destination printing device and a linking service 140. In examples described herein, a "linking service" may be a service implemented by one or more networked computing devices to create and manage optically machine-readable links, and to create and manage the assignment of digital content payoffs to respective optically machine-readable links. In some examples, a linking service may provide a computing device access to a digital content payoff assigned to a given optically machine-readable link in response to an indication that the computing device has captured an image of the given optically machine-readable link.

In examples described herein, an "optically machine-readable link" (which may be referred to herein as a "machine-readable link") may be an image associated with a linking service that is optically readable by a computing device using an image capture device (e.g., a digital camera, or the like) to determine payload information with which the computing device may obtain access to a digital content payoff assigned to the image in the linking service. A machine-readable link may comprise at least one of a barcode (e.g., a one-dimensional barcode, two-dimensional barcode, matrix barcode, QUICK RESPONSE CODE (QR CODE), or the like), a digital watermark, a target image such as a printed photograph (e.g., for augmented reality), or the like.

In some examples, an optically machine-readable link, such as a barcode, may comprise the payload information encoded or embedded therein. In some examples, a machine-readable link such as digital watermark may comprise the payload information encoded or embedded in a carrier image. In such examples, a computing device using an image capture device may determine, acquire, etc., the payload information by decoding, parsing, etc., the link in accordance with the manner in which the information is encoded or embedded in the link. In other examples, a target image may not contain encoded or embedded payload information. In such examples, a computing device using an image capture device may determine, acquire, etc., the payload information based on features, characteristics, or other aspects of the target image itself, or the like, or a combination thereof. In examples described herein, a "digital content payoff" may be any suitable type of information that may be accessed (e.g., retrieved, viewed, etc.) over a computer network, such as a digital video, a website or webpage, a uniform resource identifier (URI) (such as a uniform resource locator (URL)) for web content (e.g., a website), or the like.

Examples of acquiring a linked version of print content comprising an optically machine-readable link are described below in relation to FIG. 1. In the example of FIG. 1, computing device 100 includes a processing resource 110 and a machine-readable storage medium 120 comprising (e.g., encoded with) instructions 122, 124, and 126 executable by processing resource 110. Components of computing device 100 (e.g., processing resource 110) may be considered as components of remote printing service 170. In some examples, storage medium 120 may include additional instructions. In some examples, instructions 122, 124, and 126, and any other instructions described herein in relation to storage medium 120, may be stored on a machine-readable storage medium remote from but accessible to computing device 100 and processing resource 110 (e.g., via a computer network). In some examples, instructions 122, 124, and 126 may be instructions of a computer program, computer application ("app"), agent, or the like, of computing device 100. In other examples, the functionalities described herein in relation to instructions 122, 124, and 126 may be implemented as engines comprising any combination of hardware and programming to implement the functionalities of the engines, as described below.

As used herein, a "computing device" may be a desktop computer, laptop (or notebook) computer, workstation, tablet computer, mobile phone, smart device, server, blade enclosure, or any other processing device or equipment. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.) a message 130 requesting that print content 138 included in the message 130 be printed via remote printing service 170 at a destination printing device specified in message 130. Message 130 may be acquired from a sending computing device that is remote from remote printing service 170 (e.g., computing device 100 at least partially implementing service 170). The sending computing device from which message 130 is acquired may also be at least one of different than and remote from the specified destination printing device. As noted above, in some examples, message 130 may specify the destination printing device at which to print content 138. For example, remote printing service 170 may comprise (or have access to) information indicating email addresses assigned to destination printing devices for remote printing service 170. In some examples, message 130 may be an email message including, as a destination address of the email message, an email address assigned to the destination printing device for remote printing service 170. In such examples, instructions 122 may acquire email message 130 from an email gateway of linking service 170 and may determine the identity of the destination printing device based on the destination address of the email message.

In examples described herein, a message may be a "request" that included (or otherwise indicated) print content be printed at a destination printing device via a remote printing service if the message indicates to the remote printing service to print the included (or otherwise indicated) content at the destination printing device. For example, an email message 130 to the email address assigned to a destination printing device for remote printing service 170 may indicate to remote printing service 170 to print included (or otherwise indicated) print content at the destination printing device.

In other examples, message 130 may be any other suitable type of message. For example, message 130 may comprise an API function call, such as a call to a print request function of an API of remote printing service 170. In such examples, a computer application (or "app") of a sending computing device may provide the API function call to remote printing service 170. In such examples, the app may be a remote printing app. In other examples, message 130 may be acquired from a web interface (e.g., a website user interface) for remote printing service 170. In such examples, instructions 122 may acquire message 130 as a web request provided in response to interaction with the web interface via a sending computing device. In any of the examples described herein, message 130 may be a single message generated by a single sending computing device.

In examples described herein, print content 138 may be any printable content in any suitable format (e.g., in a format from which the remote printing service 170 may render the content). Print content 138 may be included or otherwise specified in message 130 in any suitable manner. For example, when message 130 is an email message, print content 138 may be content (e.g., text, image(s), etc.) in the body of email message, or content in file(s) included in email message 130 as attachment(s). In some examples, print content may comprise text, image(s), or other printable content, and may be contained in file(s) of any suitable type (e.g., a word processor file type, an image file, a portable document format (PDF), or the like), or may be included directly in message 130 independent of a separate file type. In other examples, print content 138 may be specified in message 130 via a reference to a location from which print content 138 may be retrieved or otherwise accessed. For example, message 130 may be an API function call including a URL specifying a location at which print content 138 may be accessed. In other examples, any other suitable references to print content 138 may be included in message 130.

In the example of FIG. 1, message 130 may comprise link information 132 specifying a selected type 134 of optically machine-readable link and specifying a digital content payoff 136. For example, the selected type 134 of optically machine-readable link specified in information 132 may be any one of a barcode (e.g., a particular type of barcode), a digital watermark, an augmented reality link, or any other type of optically machine-readable link. In examples described herein, an augmented reality link may be an image associated with a digital video via an augmented reality service of a linking service (such as linking service 140). Such an image may not contain payload information encoded or embedded therein, as described above. In such examples, a computing device that captures the image with an image capture device may determine the payload information based on features, characteristics, or other aspects of the image itself, or the like, or a combination thereof.

The digital content payoff 136 may be any suitable content payoff, as described above, such as a URL, a digital video, or the like. In some examples, the digital content payoff 136 may be included in message 130. For example, when the digital content payoff 136 is a video, message 130 may include the video (e.g., as an attachment when message 130 is an email message). When the digital content payoff 136 is a URL, message 130 may include the URL in text form in the message. In some examples, the digital content payoff 136 may comprise content different than that of print content 138. For example, print content 138 may comprise a word processing or PDF document including at least one of text and image(s), while digital content payoff 136 is a digital video, a website having content different from print content 138, or URL for a website or file having content different than print content 138.

In response to message 130, instructions 124 may determine which of a plurality of different types of optically machine-readable links is specified in link information 132. In examples described herein, "different types" of optically machine-readable links may be types of links that are parsed, read, analyzed, or otherwise interpreted to determine payload information in different ways or using different techniques, or the like. For example, barcodes, digital watermarks, and images for augmented reality are each different types of optically machine-readable links in examples described herein. As another example, different types of barcodes, such as one-dimensional barcodes and two-dimensional barcode (e.g., matrix barcodes) are different types of optically machine-readable links in examples described herein. In some examples, machine-readable links that are not readable by the same reader application may be considered different types of machine-readable links. In the example of FIG. 1, the plurality of different types of optically machine-readable links may be the plurality of different types of machine-readable links that linking service 140 may create. This plurality may include any of the types of optically machine-readable links described above, or any other type of optically machine-readable link. In examples described herein, instructions 124 may determine the specified type of machine-readable link based on link information 132 and independent of any information associated with the destination printing device or the sending computing device.

Based on the determination of which of the different types of optically machine-readable links is specified in link information 132, instructions 126 may acquire, from linking service 140, a linked version 182 of the print content comprising an optically machine-readable link of the determined type that is associated with the digital content payoff via the linking service.

In some examples, based on the determination of which types of machine-readable link is specified, instructions 126 may provide, to linking service 140, a link creation request specifying the determined type of optically machine-readable link, digital content payoff 136, and print content 138. In response, linking service 140 may create an optically machine-readable link 144 of the determined type, associate the created optically machine-readable link with digital content payoff 136, and generate a linked version 182 of print content 138 comprising the created machine-readable link 144. In some examples, linking service 140 may assign link 144 to digital content payoff 136 by creating a mapping between machine-readable link 144 (or an identifier for link 144) and digital content payoff 136 (e.g., in a database or other repository of or accessible to linking service 140).

In example described herein, linking service 140 may create the link 144 and generated the linked version differently for different types of machine-readable links. For example, for a barcode, linking service 140 may create the barcode, and then add the barcode to print content 138 (e.g., in a bottom corner of the print content). For example, for a digital watermark, linking service 140 may create the digital watermark by embedding the digital watermark in the print content 138 (e.g., an image) or a portion thereof. In some examples, a link may not be created, as in the case of images for augmented reality links. In such examples, linking service 140 may associate identifiable features, characteristics, or the like, or a combination thereof, of print content 138 (e.g., an image) or a portion thereof with digital content payoff 136 in linking service 140, and return the unchanged print content 138 as linked version 182. In such examples, the print content 138 itself (or a portion thereof) may be the machine-readable link 144.

Instructions 126 may actively or passively acquire, from linking service 140, linked version 182 of print content 138 comprising the optically machine-readable link 144 of the determined type, wherein the link 144 is associated with digital content payoff 136 via linking service 140. Linking service 140 may associate the optically machine-readable link 144 with digital content payoff 136 such that linking service 140 is to provide a computing device access to digital content payoff 136 in response to an indication that the computing device has captured an image of optically machine-readable link 144 (e.g., with an image capture device, or the like). Such association is described further in relation to FIG. 2. In such examples, the optically machine-readable link 144 is a machine-readable link thought which the digital content payoff is accessible via the linking service 140.

In some examples, after acquisition of linked version 182, instructions 126 may make available, to the destination printing device, linked version 182 of print content 138 (comprising optically machine-readable link 144) in a print-ready format for the destination printing device. In examples described herein, content in a "print-ready" format for a given printing device may be a version of the content in a format that the given printing device is able to print. For example, a given printing device may be able to print documents in one or more of portable document format (PDF), at least one version of printer command language (PCL) format (e.g., PCL3GUI, etc.), or the like. A document in any such format that may be printed by a given printing device may be considered to be in a "print-ready" format for the given printing device. In examples described herein, to "render" content is to convert the content into a print-ready format for at least one particular printing device, such as at least one destination printing device. In some examples, instructions 126 may render linked version 182 such that it is in a print-ready format, and make the rendered (i.e., print-ready) version available to the destination printing device. In other examples, other instructions of computing device 100 or other component(s) or remote printing service 170 may render linked version 182. When linked version 182 in print-ready format is made available to the destination printing device, the destination printing device may then print linked version 182 comprising optically machine-readable link 144.

As noted above, in some examples, message 130 may be an email message. In such examples, the subject, body, or other portion of email message 130 may include at least some of link information 132. In some examples, at least one of selected type 134 and digital content payoff 136 may be specified by predefined keywords used in predefined expressions. As one example, a digital watermark may be specified as the selected type 134 by an expression such as "linktype=watermark", where "linktype" is a predefined keyword to precede the specified link type, and "watermark" is a predefined keyword to indicate a digital watermark. In such examples, other types of machine-readable links may be specified by other predefined keywords such as "qrcode" for a QR CODE, and "AR" for an augmented reality link. Remote printing service 170 may provide suitable predefined keywords for each type of machine-readable link that linking service 140 may generate.

In some examples, digital content payoffs 136 may be specified in link information 132 using similar keywords and expressions. As one example, a link "http://www.url.com/payoff" may be specified as the digital content payoff 136 by an expression such as "linkpayload="http://www.url.com/payoff"", where "linkpayload" is a predefined keyword to precede the specified payload URL, and "http://www.url.com/payoff" is the URL that is the digital content payoff 136.

In such examples, print content may be printed with an optically machine-readable link to a digital content payoff by emailing the print content to the assigned email address of a destination printing device, and specifying the type of machine-readable link and digital content payoff in the email. For example, such email may include the print content as an attachment, and the email subject may comprise "linktype=watermark; linkpayload="http://www.url.com/payoff"". Such examples described herein may provide a simplified technique for a user to print content with an optically machine-readable link to a specified digital content payoff. Although example keywords and expressions are given above, in other examples, any other suitable expressions and keywords may be used. In other examples, the selected link type 134 may be specified in the subject field of email message 130, and digital content payoff 136 (e.g., a digital video) may be included in email message 130 as an attachment.

In some examples, instructions 122, 124, and 126 may be part of an installation package that, when installed, may be executed by processing resource 110 to implement the functionalities described herein in relation to instructions 122, 124, and 126. In such examples, storage medium 120 may be a portable medium, such as a CD, DVD, or flash drive, or a memory maintained by a server from which the installation package can be downloaded and installed. In other examples, instructions 122, 124, and 126 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
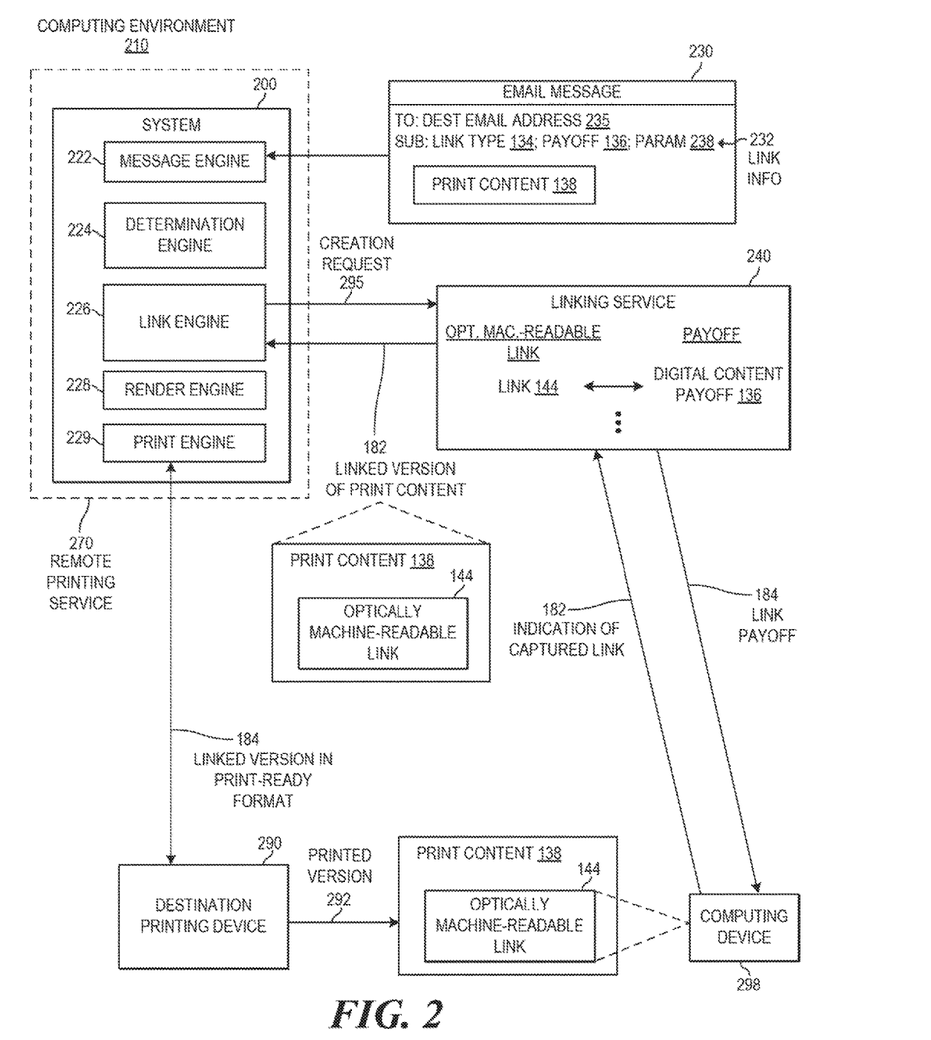
FIG. 2 is a block diagram of an example system to make available to a destination printing device a linked version of print content.

FIG. 2 is a block diagram of an example system 200 to make available a linked version 182 of print content 138 to destination printing device 290. In the example of FIG. 2, a computing environment 210 comprises a remote printing service 270 including at least system 200 to implement remote printing service 270. Computing environment 210 may also comprise a linking service 240, a destination printing device 290, and a computing device 298.

In the example of FIG. 2, system 200 includes at least engines 222, 224, 226, 228, and 229, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 222, 224, 226, 228, and 229. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 222, 224, 226, 228, and 229. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

In the example of FIG. 2, remote printing service 270 (e.g., at least system 200) is in communication with at least one destination printing device 290 and linking service 240. In examples described herein, a "printing device" may be a hardware device, such as a printer, multifunction printer (MFP), or any other device including at least functionalities to physically produce graphical representation(s) (e.g., text, images, etc.) on paper, or the like. In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

In the example of FIG. 2, a message engine 222 may actively or passively acquire a message 230 requesting that print content 138 specified in message 230 be printed at destination printing device 290 via remote printing service 270. Message 230 may be any type of message described above in relation to message 130 of FIG. 1, and may include or otherwise specify print content 138 in any suitable manner as described above in relation to message 130 of FIG. 1. Message 230 may comprise link information 232, as described above in relation to link information 132 of FIG. 1. Link information 232 may specify at least a selected type 134 of an optically machine-readable link and a digital content payoff 136, as described above in relation to message 130 of FIG. 1.

As described above in relation to message 130 of FIG. 1, message 230 may be acquired from a sending computing device that is remote from remote printing service 270 (e.g., system 200 at least partially implementing service 270). In some examples, message 130 may specify destination printing device 290 as the destination printing device at which to print content 138. For example, remote printing service 270 may comprise (or have access to) information indicating email addresses assigned to destination printing devices for remote printing service 270. In the example of FIG. 2, message 230 may be an email message 230 including, as a destination address of the email message, an email address 235 assigned to destination printing device 290 for remote printing service 270. In such examples, engine 222 may acquire email message 230 from an email gateway of linking service 270 and may determine that printing device 290 is the destination printing device based on email address 235. In other examples, message 230 may be any other suitable type of message, as described above in relation to FIG. 1. In other examples, message 230 may specify destination printing device 230 in any other suitable manner. In any of the examples described herein, message 230 may be a single message generated by a single sending computing device.

Message 230 may comprise link information 232 specifying a selected type 134 of optically machine-readable link and specifying a digital content payoff 136, as described above in relation to message 130 of FIG. 1. As described above, the digital content payoff 136 may comprise content different than that of print content 138. Determination engine 224 may determine which of a plurality of different types of optically machine-readable links is specified in link information 232. In some examples, the plurality of different types of optically machine-readable links comprises at least one type of barcode, at least one type of watermark, and at least one type of augmented reality link. In some examples, the plurality of different types may be any such plurality as described above in relation to FIG. 1. In examples described herein, engine 224 may determine the specified type of machine-readable link based on link information 232 and independent of any information associated with the destination printing device or the sending computing device.

In response to the determination of engine 224, link engine 226 may provide, to 240 linking service, a request 295 to create a linked version 182 of print content 138 such that the linked version 182 comprises an optically machine-readable link 144 of the determined type (i.e., selected type 134) that is associated with digital content payoff 136 in linking service 240.

In response to creation request 295, linking service 240 may create an optically machine-readable link 144 of the determined type (in other examples, the link 144 may not be created, as described above), associate the optically machine-readable link with digital content payoff 136 in linking service 240, and generate a linked version 182 of print content 138 comprising the machine-readable link 144. In the example of FIG. 2, linking service 240 may associate the optically machine-readable link 144 with digital content payoff 136 such that linking service 240 is to provide a computing device (such as computing device 298, for example) access to digital content payoff 136 in response to an indication that the computing device has captured an image of optically machine-readable link 144. In such examples, the optically machine-readable link 144 is a machine-readable link thought which the digital content payoff is accessible via the linking service 240. In some examples, linking service 240 may assign link 144 to digital content payoff 136 by creating a mapping between machine-readable link 144 (or an identifier for link 144) and digital content payoff 136 (e.g., in a database or other repository of or accessible to linking service 240). Such a mapping is schematically illustrated in FIG. 2. Although one assignment of a machine-readable link to digital content payoff is illustrated in FIG. 2, in some examples, linking platform 160 may comprise assignments of a plurality of machine-readable links to respective digital content payoffs.

In the example of FIG. 2, engine 226 may actively or passively acquire, from linking service 240 and based on the determination by engine 224 (i.e., the determined type of link), the linked version 182 of print content 138. The linked version 182 comprises the optically machine-readable link 144 of the determined type that is associated with digital content payoff 136 via linking service 240. Render engine 228 may render the linked version 182 of print content 138 into print-ready format for the destination printing device. Print engine 229 may make available, to destination printing device 290, a print job 184 comprising the linked version 182 of the print content in print-ready format for destination printing device 290. In some examples, destination printing device 290 may retrieve the print job 184 from remote printing service 270. In other examples, remote printing service 270 may provide print job 184 to destination printing device 290.

Destination printing device 290 may print the acquired print job 184 to produce a printed version 292 of print content 138 comprising optically machine-readable link 144. In such examples, a computing device 298 remote from linking service 170 (e.g., remote from at least system 200) may capture (e.g., with an image capture device such as a digital camera or the like) an image of optically machine-readable link 144 from printed version 292 and determine payload information for link 144 as described above (e.g., using machine-readable instructions executable to implement a reader application). In such examples, the computing device may provide an indication 182 that the computing device has captured an image of machine-readable link 144. In some examples, the indication 182 may comprise the payload information determined from link 144.

In response to indication 182, linking service 240 may determine the digital content payoff 136 assigned to link 144 and provide computing device 298 access 184 to digital content payoff 136. In examples described herein, a linking service (e.g., linking service 240) may provide a computing device access to a digital content payoff by providing a copy of the digital content (e.g., a digital video file), by enabling the computing device to view, download, etc., a remote copy of the content (e.g., a digital video file stored remotely), by directing (or redirecting) the computing device to the content (e.g., directing a browser of the computing device to a URL that is the payoff), or in any other suitable manner.

In some examples, link information 232 may further comprise at least one link parameter 238 specifying characteristic(s) related to the selected type 134 of machine-readable link. In such examples, request 295 may be a request to create the linked version 182 of print content 138 comprising an optically machine-readable link of the determined type, in accordance with the at least one link parameter 238, and associated with digital content payoff 136. In such examples, engine 224 may determine any parameter(s) 238 specified in message 230, and generate request 295 such that it indicates the parameter(s) 238 specified in message 230.

In some examples in which message 230 is an email message, parameter(s) 238 may be provided in a subject field of email message 230, or in any other part of email message 230. In other examples, parameters 238 may be provided in any suitable manner in message 230. In addition, parameters 238 may be specified using predetermined expressions, keywords, values (or ranges), or the like, as described above in relation to other aspects of link information.

In some examples, parameter(s) 238 may specify, for example, one or more of a requested size, position, density, error correction level, or the like for the selected type 134 of machine-readable link. For example, a link parameter 238 may specify a requested position, in print content 138, for the optically machine-readable link of the selected type 134 to be placed. In some examples, a link parameter 238 may specify a requested size for the optically machine-readable link of the selected type 134.

In some examples, different types of parameters may be used in connection with different types of machine-readable links. For example, example parameters 238 that may be provided with a barcode may include size and position parameters. As an example, when link information 232 specifies a selected link type of a matrix barcode, a digital content payoff 136, a size parameter 238 of "100", and a position parameter of "bottomright", linking service 240 may generate linked version 182 comprising a matrix barcode (as the machine-readable link 144) associated with digital content payoff 136 in linking service 240, the matrix barcode having a size of 100×100 pixels, and located at the bottom right of print content 138. Other parameters 238 that may be specified for a matrix barcode may include a density and an error correction level. Example parameters that may be specified for a digital watermark may include, for example, a watermark strength, resolution, or the like. Linking service 240 may generate the link 144 in accordance with the specified parameters 238 indicated in request 295. In examples in which certain parameters 238 are not included in message 230, linking service 240 may utilize default values for those parameters. In some examples, functionalities described herein in relation to FIG. 2 may be provided in combination with functionalities described herein in relation to any of FIGS. 1 and 3-4.

Figure 3:
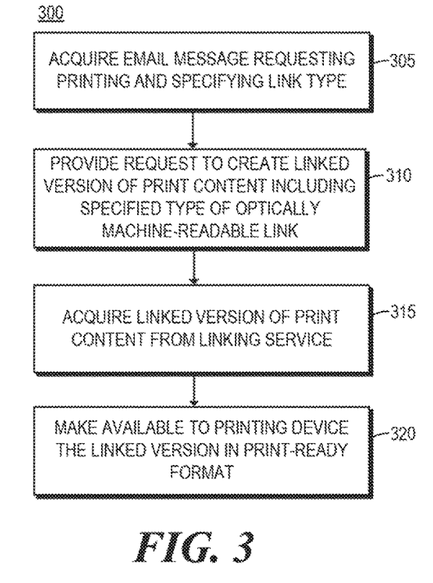
FIG. 3 is a flowchart of an example method for providing a request to create a linked version of print content to a linking service based on an email message.

FIG. 3 is a flowchart 300 of an example method for providing a request to create a linked version of print content to a linking service based on an email message. Although execution of method 300 is described below with reference to system 200 of FIG. 2 described above, other suitable systems for the execution of method 300 can be utilized (e.g., computing device 100). Additionally, implementation of method 300 is not limited to such examples.

At 305 of method 300, message engine 222 of system 200 may acquire an email message 230 requesting that print content 138 included in email message 230 be printed, via remote printing service 270, at a destination printing device 290 to which a destination address 235 of email message 230 is assigned. The message may comprise link information 232 specifying a selected type 134 of an optically machine-readable link and a digital content payoff 136 to be accessible via the selected type 134 of optically machine-readable link. In some examples, determination engine 224 may determine which of a plurality of types of machine-readable links is specified as the selected type 134. Based on email message 230 specifying the digital content payoff 136 to be accessible via the selected type 134 of optically machine-readable link, at 310, link engine 226 may provide, to linking service 240, a request 295 to create a linked version of print content 138 comprising an optically machine-readable link that is of the selected type 134 (e.g., the determined type) and that is associated with digital content payoff 136.

At 315, link engine 226 may acquire, from linking service 240, a linked version 182 of print content 182, the linked version 182 comprising the optically machine-readable link 144 of the selected type 144. In some examples, render engine 228 may render the linked version 182 into a print-ready format for determination printing device 290. At 320, print engine 229 may make available, to destination printing device 290, the linked version 182 of print content 138 in a print-ready format for destination printing device 290.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
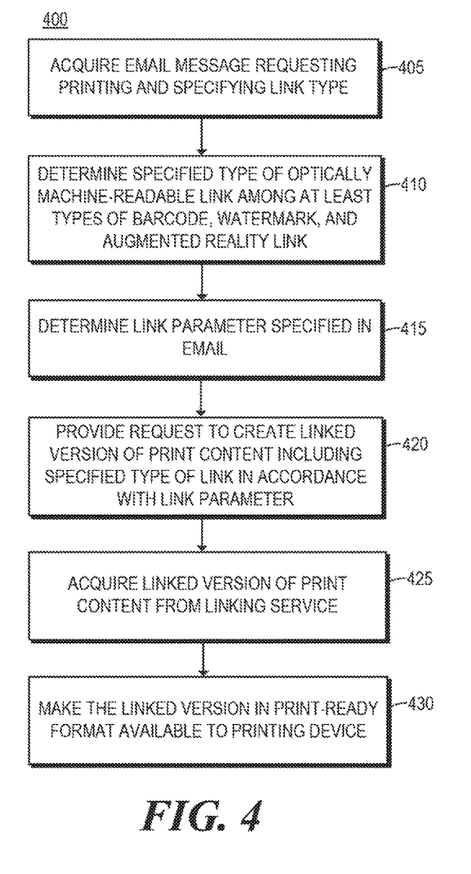
FIG. 4 is a flowchart of an example method for determining which of a plurality of different types of optically machine-readable links is specified in the email message.

FIG. 4 is a flowchart of an example method 400 for determining which of a plurality of different types of optically machine-readable links is specified in the email message. Although execution of method 400 is described below with reference to system 200 of FIG. 2 described above, other suitable systems for the execution of method 400 can be utilized (e.g., computing device 100). Additionally, implementation of method 400 is not limited to such examples. Method 400 is described below with reference to example of FIG. 2.

At 405 of method 400, message engine 222 of system 200 may acquire an email message 230 requesting that print content 138 included in email message 230 be printed, via remote printing service 270, at a destination printing device 290 to which a destination address 235 of email message 230 is assigned. The message may comprise link information 232 specifying a selected type 134 of an optically machine-readable link and a digital content payoff 136 to be accessible via the selected type 134 of optically machine-readable link. Based on email message 230 specifying the digital content payoff 136 to be accessible via the selected type 134 of optically machine-readable link, at 410, engine 224 may determine which of a plurality of different types of optically machine-readable links is specified in link information 232. In some examples, the plurality of different types of optically machine-readable links comprises at least one type of barcode, at least one type of watermark, and at least one type of augmented reality link.

At 415, determination engine 224 may determine at least one link parameter 238 specified in email message 230. In some examples, the at least one link parameter 238 may be specified in a subject line field of email message 230. At 420, link engine 226 may provide, to linking service 240 and based on email message 230, a request 295 to create a linked version of print content 138 comprising an optically machine-readable link of the determined type 134, in accordance with the at least one link parameter 238, and that is associated with digital content payoff 136 in linking service 240.

At 425, link engine 226 may acquire, from linking service 240, a linked version 182 of print content 182, the linked version 182 comprising the optically machine-readable link 144 of the selected type 144. In some examples, render engine 228 may render the linked version 182 into a print-ready format for determination printing device 290. At 430, print engine 229 may make available, to destination printing device 290, the linked version 182 of print content 138 in a print-ready format for destination printing device 290.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory machine-readable storage medium comprising instructions executable by a processing resource of a remote printing service to:
acquire a message from a remote computing device, wherein the message includes:
print content,
a request that the print content be printed at a specified destination printing device via the remote printing service, and
link information, including:
a specification of a type of an optically machine-readable link to be incorporated into a linked version of the print content, and
a digital content payoff to be linked to by the optically machine-readable link;
in response to the acquisition of the message, determine which of a plurality of different types of optically machine-readable links is specified in the link information;
based on the determination, acquire, from a linking service, a linked version of the print content comprising the print content and an optically machine-readable link of the specified type, through which the digital content payoff is accessible via the linking service
render the linked version of the print content into a print-ready format for the destination printing device.

2. The storage medium of claim 1, wherein the instructions to acquire the linked version further comprise instructions to:
make available, to the destination printing device, the rendered linked version of the print content in the print-ready format for the destination printing device.

3. The storage medium of claim 1, wherein the instructions to acquire the linked version of the print content comprise instructions to:
provide, to the linking service, a link creation request including:
the specification of the type of optically machine-readable link,
the digital content payoff, and
the print content.

4. The storage medium of claim 1, wherein:
the message is a single message generated by a single sending computing device; and
the optically machine-readable link of the specified type is associated with the digital content payoff via the linking service such that the linking service is to provide a computing device access to the digital content payoff in response to an indication that the computing device has captured an image of the optically machine-readable link.

5. The storage medium of claim 1, wherein the message comprises an email message including, as a destination address of the email message, an email address assigned to the destination printing device for the remote printing service.

6. A system comprising:
instructions executable by a processing resource to:
acquire a message from a remote computing device, wherein the message includes:
print content;
a request that the print content be printed at a destination printing device via a remote printing service, and
link information, including:
a specification of a type of an optically machine-readable link to be incorporated into a linked version of the print content, and
a digital content payoff to be linked to by the optically machine-readable link;

determine, from the acquired message, which of a plurality of different types of optically machine-readable links is specified in the link information;

acquire, from a linking service and based on the determination, a linked version of the print content comprising the print content and an optically machine-readable link, of the type specified in the link information, that is associated with the digital content payoff via the linking service such that the linking service is to provide a computing device access to the digital content payoff in response to an indication that the computing device has captured an image of the optically machine-readable link; and render the linked version of the print content into the print-ready format for the destination printing device;

transmit the rendered linked version of the print content to the destination printing device in the print-ready format for the destination printing device.

7. The system of claim 6, wherein the message comprises an email message including, as a destination address of the email message, an email address assigned to the destination printing device for the remote printing service, and comprising the print content.

8. The system of claim 7, comprising the instructions executable by the processing resource to, in response to the determination:
provide, to the linking service, a request to create the linked version of the print content comprising the optically machine-readable link of the determined type that is associated with the digital content payoff.

9. The system of claim 8, wherein:
the link information further including at least one link parameter; and
the request comprises a request to create, in accordance with the at least one link parameter, the linked version of the print content comprising the optically machine-readable link of the specified type that is associated with the digital content payoff.

10. The system of claim 9, wherein the at least one link parameter specifies at least one of a position for the optically machine-readable link in the print content and a size for the optically machine-readable link.

11. The system of claim 6, wherein the plurality of different types of optically machine-readable links comprises at least one type of barcode, at least one type of watermark, and at least one type of augmented reality link.

12. The system of claim 6, comprising the instructions executable by the processing resource to:

wherein the digital content payoff comprises at least one of a digital video and a uniform resource locator (URL).

13. A method comprising:
acquiring an email message from a remote computing device, wherein the email message includes:
print content,
a request that the print content be printed, via a remote printing service, at a destination printing device to which a destination address of the email message is assigned, and
link information, including:
a specification that an augmented reality type of an optically machine-readable link be utilized in a linked version of the print content, and
a digital content payoff to be accessible via the augmented reality type of optically machine-readable link;

based on the email message, providing, to a linking service, a request to create an augmented reality type of an optically machine-readable link by associating, at the linking service, identifiable features of the print content with a digital content payoff, and;

acquiring, from the linking service, the print content; and providing, to the destination printing device, the print content in a print-ready format for the destination printing device, wherein a computing device may be provided access to the digital content payoff responsive to an indication that the computing device has captured an image including the identifiable features of the print content.

14. The method of claim 13,
wherein acquiring the print content includes acquiring the print content unchanged from the print content included in the email message; and
wherein the request comprises a request to create, in accordance with at least one link parameter specified in the email message, the linked version of the print content comprising the augmented reality optically machine-readable link by associating the identifiable features of the print content with the digital content payoff without changing the pint content.

15. The method of claim 14, wherein:
the identifiable features are identified from the print content included in the email message.

* * * * *